May 12, 1970     E. W. SHAFFER, JR     3,511,972
AMBIENT TEMPERATURE ADAPTIVE ON-OFF TEMPERATURE CONTROL CIRCUIT
Filed Feb. 19, 1969
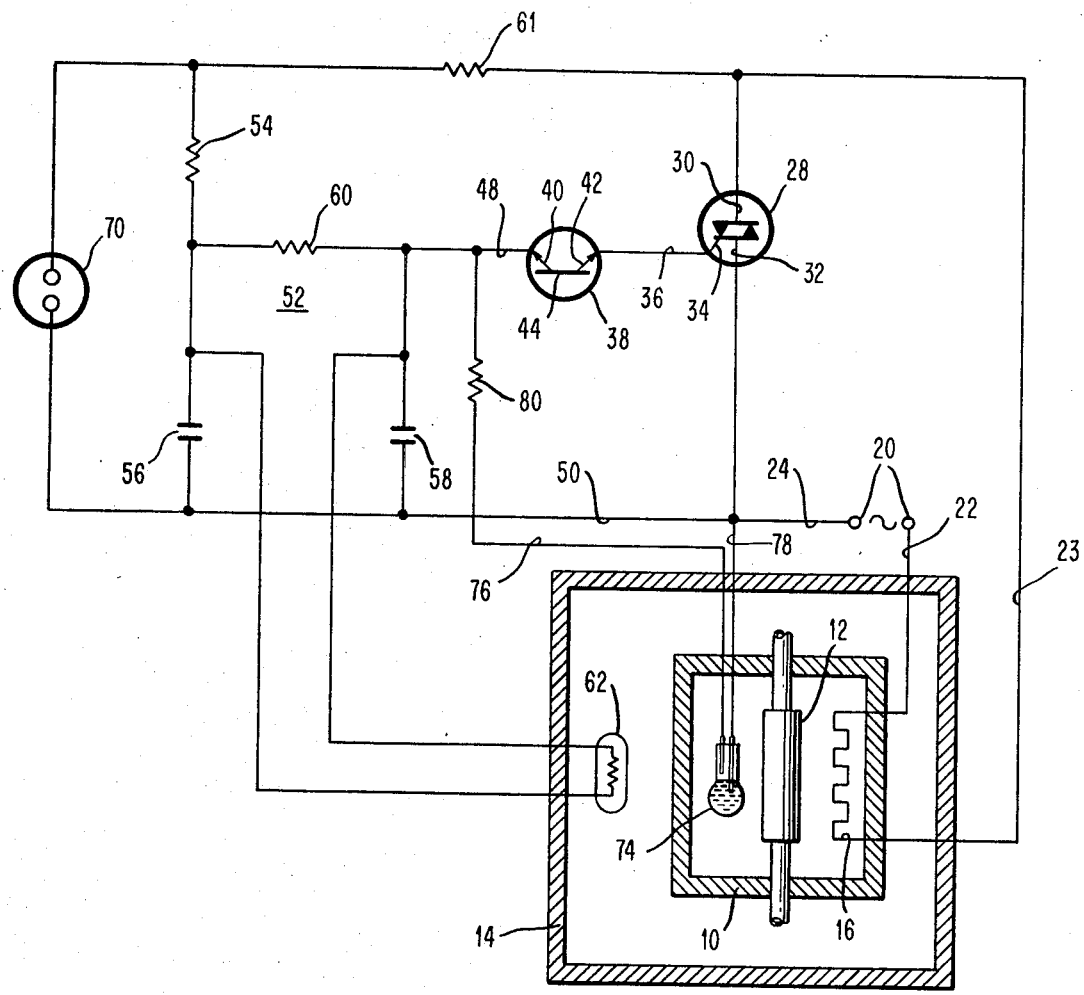
INVENTOR
EARL W. SHAFFER JR.
BY William G. Miller Jr.
AGENT

United States Patent Office 3,511,972
Patented May 12, 1970

3,511,972
AMBIENT TEMPERATURE ADAPTIVE ON-OFF TEMPERATURE CONTROL CIRCUIT
Earl W. Shaffer, Jr., Warrington, Pa., assignor to Leeds & Northrup Company, Philadelphia, Pa., a corporation of Pennsylvania
Filed Feb. 19, 1969, Ser. No. 800,450
Int. Cl. H05b 1/02
U.S. Cl. 219—501                7 Claims

ABSTRACT OF THE DISCLOSURE

A solid state switch allows A.C. current to flow through a heater during a portion of each cycle of the A.C. source when the temperature being controlled is below its desired value. The portion of the cycle during which the heater current flows is modified by a phase control circuit in response to the ambient temperature as detected by a thermistor forming part of the phase control circuit so that more power goes to the heater when the ambient temperature is low. A thermostat prevents conduction of the solid state switch and hence prevents current flow through the heater when the temperature under control exceeds the desired value.

BACKGROUND OF THE INVENTION

This invention relates to on-off temperature control circuits and more particularly to a circuit in which current flow through the temperature modifying element during the "on" period is modified in response to variations in the ambient temperature.

In the past, when it was necessary to control the temperature in an enclosure using on-off control, current was supplied so that the rate at which power was delivered through the temperature modifying element was the same during each "on" period. Such an arrangement frequently showed a tendency to produce poor control. For example, temperature cycles of excessive amplitude might occur when the enclosure was subjected to wide variations in ambient temperature. If the heater was designed to rapidly return the temperature of the enclosure to its desired value under conditions in which the temperature around the enclosure differed widely from that desired in the enclosure, that same heater would tend to produce excessive overshoot of the temperature when the temperature difference was slight, for under such conditions the heat supplied to the enclosure would be supplied at too high a rate.

It is an object of this invention to provide means for modifying the rate at which a temperature under control is modified when the temperature is not at the desired value by varying the rate at which the temperature is modified in accordance with the ambient temperature conditions.

SUMMARY OF THE INVENTION

In carrying out this invention there is provided a circuit for controlling the temperature of an object which may be the interior of an enclosure by varying the current flow through a temperature modifying element for either providing heat or taking away heat, depending upon whether the control is a heating control or a cooling control. A pair of power supply terminals provide a means for connecting the circuit to an A.C. source and a switching element is provided for selectively connecting those supply terminals to the temperature modifying element to allow current flow through the element.

The switching element is of the type having a pair of output electrodes and a gate electrode which is operable in response to a gating signal of a predetermined magnitude to provide conduction between the output electrodes during a portion of the period of each cycle of the A.C. source with the magnitude of the conductive portion being dependent upon the phase relationship between the gating signal and the A.C. source. For providing the gating signal there is a phase control circuit which is connected to the power supply terminals and is operable to produce the gating signal for the switching element so that the gating signal has a phase relationship to the phase of the A.C. source, which relationship is variable in response to the ambient temperature around the object or enclosure whose temperature is being controlled so that there is a variation of the duration of the conductive portions of each cycle of the A.C. source which variation is in sense to tend to reduce the effect of ambient temperature changes on the control of the temperature.

A temperature responsive element which is responsive to the temperature of the object or enclosure is connected in circuit with the switching element so as to prevent conduction between the output electrodes of the switching element when the temperature of the object is beyond a predetermined desired value so as to prevent further temperature change in that direction.

BRIEF DESCRIPTION OF THE DRAWING

The drawing is a detailed circuit diagram of the preferred form of the invention.

DESCRIPTION OF THE PREFERRED EMBODIMENT

In the figure there is shown an enclosure 10 which has in its interior an object 12 whose temperature is to be controlled by control of the temperature in the enclosure itself. The object 12 may, for example, be a thermal conductivity cell in a gas analyzer or some other type of analytical element. Normally, enclosures such as the enclosure 10 will be contained within a cabinet 14 in which the ambient temperature around the enclosure 10 may be subject to variation due to the wide variation of temperatures to which the cabinet 14 is exposed. In the figure, the temperature in the enclosure, that is, the temperature of the object 12, is controlled by passing current through the temperature modifying element shown as heater 16 since in this example it is desired that the temperature in the enclosure be maintained at an elevated value with respect to the ambient temperature within the cabinet 14. The circuit shown in the drawing includes a pair of power supply terminals 20 which are adapted to be connected to an A.C. source as, for example, a source of supply which provides 120 volts of A.C. at 60 hertz. By means of the wire connections 22, 23 and 24 the power supply terminals 20 are connected to the heater 16 through the switching element 28 whenever that switching element is in a conductive state. The switching element 28 is shown as a Triac which has load current carrying or main electrodes 30 and 32 and a gate electrode 34. The Triac is a solid state A.C. switching element which provides a conductive path in either direction between the main electrodes 30 and 32 whenever the potential of the signal supplied to gate electrode 34 is sufficient in magnitude to cause the Triac to fire. The Triac then remains conductive until the potential between main electrodes 30 and 32 has decreased to zero.

The gating signal supplied to gate electrode 34 on line 36 is provided by a solid state switching element 38 shown in the figure as a Diac which has electrodes 40 and 42 connected to the semiconductor base 44. Whenever the potential across the electrodes 40 and 42 reaches a certain potential in either a positive or negative polarity, conduction in the appropriate direction is provided between those electrodes so that the potential appearing on line 48 produces on line 36 the gating signal for the Triac 28. Once the Diac 38 has fired, it remains conductive until the potential between electrodes 40 and 42 is reduced to zero.

It will be evident that the Triac 28 will be conductive to allow current flow to the heater 16 during that portion of each cycle of the A.C. current supplied at terminals 20 after the gate electrode 34 has received a gating signal of sufficient magnitude to fire the Triac, and that gating signal will be provided by the Diac 38 during that portion of the A.C. signal supplied between lines 48 and 50 during which the Diac 38 is conductive. Thus, by changing the phase relationship between the A.C. potential supplied between the lines 48 and 50 as compared with the phase of the power supply connected to terminals 20, conduction through the heater 16 can be provided only during certain portions of each cycle of the source in dependence upon the phase relationship established.

In order to be able to vary the portions of each cycle of the A.C. source during which conduction occurs through the Triac 28, there is provided a phase control circuit 52 which consists of the input resistor 54, a first shunt capacitor 56 and a second shunt capacitor 58 and the interposed resistor 60 and its parallel connected thermistor 62. If we consider the phase control circuit without the thermistor 62, it is evident that the circuit is a common type of π connected RC network used to vary the phase of an A.C. supply with the capacitors 56 and 58 being essentially connected in shunt with the supply and the resistors 54 and 60 being essentially in series with source. The phase control circuit 52 is connected to the power supply terminals 20 through a current limiting resistor 61, line 23, heater 16 and line 22 as well as through lines 24 and 50.

A neon lamp 70 is connected in shunt with the resistors 54 and capacitor 56 so as to limit the potential supplied to the phase control circuit 52. The resistor 61 is then incorporated in the connection to the terminals 20 so as to limit the current flow through the neon lamp 70 so that it will not be excessive.

By connecting the thermistor 62, which in this example is a thermistor having a positive temperature coefficient, in shunt with the resistor 60 the temperature of the ambient air in cabinet 14 surrounding the enclosure 10 will be effective to modify the phase of the gating signal supplied to line 36 in dependence upon the temperature surrounding the enclosure 10 in cabinet 14.

For control of the temperature within the enclosure 10 there is shown in the figure a mercury thermostat 74 which is arranged to supply a conductive path by way of the lines 76 and 78 whenever the temperature in the enclosure 10 is above the predetermined desired value. The conductive path between lines 76 and 78 then serves to connect, by way of resistor 80, the line 48 and the line 50 so as to maintain the line 48 at a potential sufficiently low so that the Diac 38 cannot be fired and hence no gating signal can be supplied on line 36.

From the above description it will be evident that in the operation of the circuit of the diagram for controlling the temperature of the object 12 within the enclosure 10 the thermostat 74 is effective to prevent a gating signal on line 36 and hence to prevent the Triac 28 from being conductive to supply current through the heater 16 whenever the temperature detected by the thermostat 74 is above the desired temperature. When, however, the temperature detected by the thermostat 74 is below the desired temperature, the conducive path between lines 76 and 78 is broken and a gating signal is then supplied to the Triac 28 so that it is conductive during a certain portion of the cycle of the A.C. source to provide current flow through the heater 16 during that portion of each cycle of the source. Thus, the amount of heat supplied to the enclosure 10 is dependent directly upon the relative magnitude of the portion of each cycle of the A.C. source during which the Triac 28 is conductive.

As previously mentioned, the portion of the cycle of the power source during which the Triac is conductive is dependent upon the phase relationship between the gating signal on line 36 and the A.C. source connected to terminals 20. The phase of the gating signal 36 will be directly dependent upon the effective resistance of the thermistor which is responsive to the temperature within the cabinet 14; namely, the ambient temperature around the enclosure 10, for the resistance of the thermistor 62 is effective to determine the phase of the gating signal on line 36 by virtue of its effect in the phase control circuit 52.

Since the thermistor 62 in this example has a positive temperature coefficient, its effective resistance is higher at the higher temperatures. The result is that the Triac 28 is conductive during a portion of each cycle of the A.C. supply. That portion is increased as the ambient temperature detected by the thermistor decreases so that at low ambient temperatures increased power will be supplied to the heater 16 during each power supply cycle as compared with the amount of power supplied to the heater 16 when the ambient temperature is at a higher level. By so modifying the rate at which heat is supplied to the enclosure 10 in dependence upon the ambient temperature around the enclosure, the normal cycling which is expected due to the on-off type of control used for enclosure 10 will then have a minimum period and what cycling there is will exhibit a minimum amplitude.

In one form, the various elements used in the circuit of the drawing may be as set forth in the following table:

| Element: | Value |
|---|---|
| Triac 28 | RCA 40526. |
| Diac 38 | 2N4992. |
| Resistor 54 | 180K. |
| Resistor 60 | 390K. |
| Resistor 61 | 33K. |
| Resistor 80 | 5.6K. |
| Thermistor 62 | Carborundum Co. D0904P-12. |
| Thermostat 74 | Princo T-144. |
| Neon lamp 70 | Signalite AO-83. |
| Capacitors 56 and 58 | 0.05 µfd., 200 v. |

In other types of applications the circuit of the drawing can be utilized to provide a cooling rather than a heating of the object or enclosure. For example, by substituting for the heater 16 a thermoelectric type of cooler with associated transformers, rectification and filtering means to provide D.C. power, the cooling effect is directly related to the amount of current supplied. In such an arrangement the thermistor 62 should have a negative temperature coefficient so that when the temperature in the enclosure is above the desired value, the amount of power supplied, which is dependent upon the ambient temperature measured by the thermistor 62, will tend to increase when the ambient temperature is at a high level as compared with the power supplied when the ambient temperature is at a low level. The thermostat 74 would, of course, have to be of the type which provides a conductive path when the temperature being controlled is below the desired value. However, a mercury thermostat such as 74 and its current limiting resistor 80 could be connected in line 48 instead of between lines 48 and 50, as shown in the figure. With such an arrangement the Triac 28 would not fire when the temperature detected was below the desired value.

What is claimed is:
1. A circuit for controlling the temperature of an object by varying the current flow through a temperature modifying element comprising:
   power supply terminals for connection to an A.C. source, a switching element for selectively connecting said supply terminals and said temperature modifying element to allow current flow through said temperature modifying element, said switching element having a pair of main electrodes and a gate electrode operable in response to a gating signal of a predetermined magnitude to provide conduction between said main electrodes during a portion of the period of each cycle of the source of magnitude dependent upon the phase relationship of said gating signal and the source, a phase control circuit connected to said power supply terminals and operable to produce a gating signal for said switching element having a phase relationship to the phase of said source which is variable in response to the ambient temperature around said object so as to vary the duration of said conductive portions of the periods of each source cycle in sense to tend to reduce the effect of ambient temperature changes on the control of the object temperature, and an element responsive to the temperature of said object and connected in circuit with said switching element so as to prevent conduction between the main electrodes of said switching element and thereby prevent further temperature change by the temperature modifying element when the temperature of said object is beyond a predetermined desired value.

2. A circuit as set forth in claim 1 in which the switching element is a solid state element.

3. A circuit as set forth in claim 1 in which the phase control circuit is an RC network.

4. A circuit as set forth in claim 1 in which the element responsive to the temperature of the object is a thermostat which is conductive when the temperature of the object is above the desired value and is non-conductive when the temperature is below the desired value.

5. A circuit as set forth in claim 1 in which the switching element is a solid state A.C. switch and the phase control circuit comprises an RC network including a thermistor and the element responsive to the temperature of the object is a mercury thermostat which is conductive when the temperature of the object is above the desired value and is non-conductive when the temperature is below the desired value.

6. A circuit for controlling the temperature in an enclosure to be heated by varying the current flow through a resistance heating element in said enclosure comprising:

a pair of power supply terminals for connection to an A.C. source, a solid state A.C. switch for selectively connecting said supply terminals to said heating element to allow current flow through said heating element, said switch having a pair of main electrodes and a gate electrode operable in response to a gating signal of a predetermined magnitude to make said switch conductive during a portion of each cycle of the source which portion is variable in dependence upon the phase relationship of the gating signal and the source, an RC phase control circuit connected to said supply terminals so that the capacitors of the circuit are in shunt connection to the supply terminals and a resistance element is interposed between the capacitors to form a $\pi$ network, a thermistor with a positive temperature coefficient connected in shunt with the resistor of said $\pi$ network so that the gating signal produced at the output of said control phase circuit has a phase relation to the phase of said source which is variable in response to the ambient temperature around said enclosure so as to increase the duration of the conductive portions of the periods of each cycle of the source as the ambient temperature decreases, and a thermostat responsive to the temperature in said enclosure so that it forms a conductive path in shunt to said phase control circuit when the temperature in said enclosure is above a predetermined desired value.

7. A circuit for controlling the temperature in an enclosure by varying the current flow through a temperature modifying element in said enclosure comprising;

a pair of power supply terminals for connection to an A.C. source, a solid state A.C. switch for selectively connecting said supply terminals to said element to allow current flow through said element, said switch having a pair of main electrodes and a gate electrode operable in response to a gating signal of a predetermined magnitude to make said switch conductive during a portion of each cycle of the source which portion is variable in dependence upon the phase relationship of the gating signal and the source, an RC phase control circuit connected to said supply terminals so that the capacitors of the circuit are in shunt connection to the supply terminals and a resistance element is interposed between the capacitors to form a $\pi$ network, a thermistor connected in shunt with the resistor of said $\pi$ network so that the gating signal produced at the output of said control phase circuit has a phase relation to the phase of said source which is variable in response to the ambient temperature around said enclosure so as to increase the duration of the conductive portions of the periods of each cycle of the source as the ambient temperature deviates a greater amount from the desired temperature in said enclosure, and a thermostat responsive to the temperature in said enclosure so that it forms a conductive path in shunt to said phase control circuit when the temperature in said enclosure is beyond the predetermined desired value in the sense in which correction cannot be effected by supplying current to the temperature modifying element.

References Cited

UNITED STATES PATENTS

| 3,161,759 | 12/1964 | Gambill et al. | 219—501 |
| 3,175,076 | 3/1965 | Fox et al. | 219—494 |
| 3,385,957 | 5/1968 | Munson et al. | 219—501 |
| 3,456,096 | 7/1969 | Bilbro | 219—501 |

GEORGE HARRIS, Primary Examiner

F. E. BELL, Assistant Examiner

U.S. Cl. X.R.

219—504